(12) United States Patent
Rihn et al.

(10) Patent No.: US 10,248,850 B2
(45) Date of Patent: Apr. 2, 2019

(54) GENERATING ACTIONS BASED ON A USER'S MOOD

(71) Applicant: Immersion Corporation, San Jose, CA (US)

(72) Inventors: William S. Rihn, San Jose, CA (US); Amaya Becvar Weddle, San Jose, CA (US); David M. Birnbaum, Oakland, CA (US)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 15/054,587

(22) Filed: Feb. 26, 2016

(65) Prior Publication Data

US 2016/0253552 A1    Sep. 1, 2016

Related U.S. Application Data

(60) Provisional application No. 62/126,185, filed on Feb. 27, 2015.

(51) Int. Cl.
| | |
|---|---|
| G06K 9/00 | (2006.01) |
| G06F 3/01 | (2006.01) |
| G06F 3/03 | (2006.01) |
| G06Q 10/10 | (2012.01) |
| H04M 1/725 | (2006.01) |
| H04L 29/08 | (2006.01) |
| H04L 12/58 | (2006.01) |
| H04W 4/02 | (2018.01) |

(52) U.S. Cl.
CPC ........ *G06K 9/00302* (2013.01); *G06F 3/011* (2013.01); *G06F 3/015* (2013.01); *G06F 3/016* (2013.01); *G06F 3/0304* (2013.01); *G06Q 10/107* (2013.01); *H04L 51/04* (2013.01); *H04L 51/10* (2013.01); *H04L 51/32* (2013.01); *H04L 67/18* (2013.01); *H04M 1/72552* (2013.01); *H04M 1/72569* (2013.01); *H04M 1/72572* (2013.01); *G06F 2203/011* (2013.01); *H04M 2250/12* (2013.01); *H04M 2250/52* (2013.01); *H04W 4/02* (2013.01)

(58) Field of Classification Search
None
See application file for complete search history.

(56) References Cited

U.S. PATENT DOCUMENTS

| | | | |
|---|---|---|---|
| 6,850,150 B1 | 2/2005 | Ronkainen | |
| 7,039,676 B1 * | 5/2006 | Day | H04M 3/567 345/473 |
| 7,159,008 B1 * | 1/2007 | Wies | G06F 3/01 709/203 |
| 8,390,439 B2 | 3/2013 | Cruz-Hernandez | |
| 9,367,136 B2 | 6/2016 | Latta et al. | |
| 9,370,459 B2 | 6/2016 | Mahoney | |
| 9,370,704 B2 | 6/2016 | Marty | |
| 9,392,094 B2 | 7/2016 | Hunt et al. | |
| 9,462,262 B1 | 10/2016 | Worley, III et al. | |
| 9,626,805 B2 | 4/2017 | Lampotang et al. | |

(Continued)

*Primary Examiner* — Ryan P Potts
(74) *Attorney, Agent, or Firm* — Miles & Stockbridge P.C.

(57) ABSTRACT

A system determines a mood of an associated user. Based on the determined mood, an action to be performed by the system is determined. The system then initiates the determined action by transmitting an object that corresponds to the determined mood to another system.

19 Claims, 6 Drawing Sheets

(56) References Cited

U.S. PATENT DOCUMENTS

| | | |
|---|---|---|
| 9,645,646 B2 | 5/2017 | Cowley et al. |
| 9,652,037 B2 | 5/2017 | Rubin et al. |
| 9,760,166 B2 | 9/2017 | Ammi et al. |
| 9,811,854 B2 | 11/2017 | Lucido |
| 9,851,799 B2 | 12/2017 | Keller et al. |
| 9,933,851 B2 | 4/2018 | Goslin et al. |
| 9,948,885 B2 | 4/2018 | Kurzweil |
| 2002/0054174 A1 | 5/2002 | Abbott et al. |
| 2006/0025220 A1* | 2/2006 | Macauley ............... A63F 13/12 463/42 |
| 2006/0059236 A1* | 3/2006 | Sheppard ............... H04L 51/04 709/206 |
| 2007/0260984 A1* | 11/2007 | Marks ..................... A63F 13/06 715/706 |
| 2008/0027984 A1 | 1/2008 | Perdomo et al. |
| 2008/0153554 A1* | 6/2008 | Yoon ................. H04M 1/72547 455/567 |
| 2008/0287147 A1 | 11/2008 | Grant et al. |
| 2010/0123588 A1 | 5/2010 | Cruz-Hernandez |
| 2010/0177116 A1* | 7/2010 | Dahllof ................... G06F 3/011 345/619 |
| 2011/0102160 A1 | 5/2011 | Heubel et al. |
| 2011/0291953 A1* | 12/2011 | Cheok ..................... G06Q 10/06 345/173 |
| 2013/0038756 A1 | 2/2013 | Cheng |
| 2013/0159919 A1* | 6/2013 | Leydon ................. G06F 3/0236 715/780 |
| 2013/0346515 A1* | 12/2013 | DeLuca ................. G06Q 50/01 709/206 |
| 2016/0070348 A1 | 3/2016 | Cowley et al. |
| 2016/0084605 A1 | 3/2016 | Monti |
| 2016/0086457 A1 | 3/2016 | Baron et al. |
| 2016/0163227 A1 | 6/2016 | Penake et al. |
| 2016/0166930 A1 | 6/2016 | Bray et al. |
| 2016/0169635 A1 | 6/2016 | Hannigan et al. |
| 2016/0170508 A1 | 6/2016 | Moore et al. |
| 2016/0171860 A1 | 6/2016 | Hannigan et al. |
| 2016/0171908 A1 | 6/2016 | Moore et al. |
| 2016/0187969 A1 | 6/2016 | Larsen et al. |
| 2016/0187974 A1 | 6/2016 | Mallinson |
| 2016/0201888 A1 | 7/2016 | Ackley et al. |
| 2016/0209658 A1 | 7/2016 | Zalewski |
| 2016/0214015 A1 | 7/2016 | Osman et al. |
| 2016/0214016 A1 | 7/2016 | Stafford |
| 2016/0375170 A1 | 12/2016 | Kursula et al. |
| 2017/0102771 A1 | 4/2017 | Lei |
| 2017/0103574 A1 | 4/2017 | Faaborg et al. |
| 2017/0131775 A1 | 5/2017 | Clements |
| 2017/0148281 A1 | 5/2017 | Do et al. |
| 2017/0154505 A1 | 6/2017 | Kim |
| 2017/0168576 A1 | 6/2017 | Keller et al. |
| 2017/0168773 A1 | 6/2017 | Keller et al. |
| 2017/0178407 A1 | 6/2017 | Gaidar et al. |
| 2017/0203221 A1 | 7/2017 | Goslin et al. |
| 2017/0203225 A1 | 7/2017 | Goslin |
| 2017/0206709 A1 | 7/2017 | Goslin et al. |
| 2017/0214782 A1 | 7/2017 | Brinda |
| 2017/0257270 A1 | 9/2017 | Goslin et al. |
| 2017/0352185 A1 | 12/2017 | Bonilla Acevedo et al. |
| 2018/0050267 A1 | 2/2018 | Jones |
| 2018/0053351 A1 | 2/2018 | Anderson |
| 2018/0077976 A1 | 3/2018 | Keller et al. |
| 2018/0081436 A1 | 3/2018 | Keller et al. |
| 2018/0093181 A1 | 4/2018 | Goslin et al. |
| 2018/0107277 A1 | 4/2018 | Keller et al. |
| 2018/0120936 A1 | 5/2018 | Keller et al. |

* cited by examiner

GENERATING ACTIONS BASED ON A USER'S MOOD

CROSS REFERENCE TO RELATED APPLICATIONS

This application claims priority of Provisional Patent Application Ser. No. 62/126,185, filed on Feb. 27, 2015, the contents of which is hereby incorporated by reference.

FIELD

One embodiment is directed generally to communications between devices, and in particular to the communication of user sensed parameters between devices.

BACKGROUND INFORMATION

The use of mobile devices, including handheld electronic devices, such as smartphones, tablets, etc., and wearable devices, such as smartwatches, fitness bands, etc., has expanded the ways in which people communicate with each other in real time. For example, texting has become a popular way to send brief communications to another user of a mobile device without having to call the person on the phone or send an e-mail. One drawback from texting and communicating via e-mail is the lack of emotion conveyed in such written communications. The addition of emoticons, such as :), :(, :D, =), etc., animated emoticons, emoji, kaomoji, etc., has allowed some type of emotion to be included in written communications, and the addition of electronic stickers selected from a predefined stack or library of electronic stickers, such as ☺, ☻, etc. has provided even more ways to communicate emotions and allow shortcuts when communicating to save time. However, even the use of emoticons, animated emoticons, emoji, kaomoji, electronic stickers, etc. does not provide any indication of the user's true mood and meaning behind the words in a text message, for example.

In addition, hands-free operation of mobile devices is becoming more prevalent. For example, voice commands may be used to instruct a mobile device to trigger an action, such as dialing a telephone number, or searching for information. It is desirable to have other hands-free ways to trigger such actions.

SUMMARY

One embodiment is system that determines a mood of an associated user. Based on the determined mood, an action to be performed by the system is determined. The system then initiates the determined action by transmitting an object that corresponds to the determined mood to another system.

BRIEF DESCRIPTION OF THE DRAWINGS

The components of the following figures are illustrated to emphasize the general principles of the present disclosure and are not necessarily drawn to scale. Reference characters designating corresponding components are repeated as necessary throughout the Figures for the sake of consistency and clarity.

DETAILED DESCRIPTION

One embodiment determines the mood of a user associated with an electronic device, such as a smartphone. Based on the determined mood, an embodiment generates a message to be sent to another electronic device, where the message includes an automatically selected visual or haptic component based on the mood. In other embodiments, other types of actions can automatically be initiated based on the determined mood.

Figure 1:
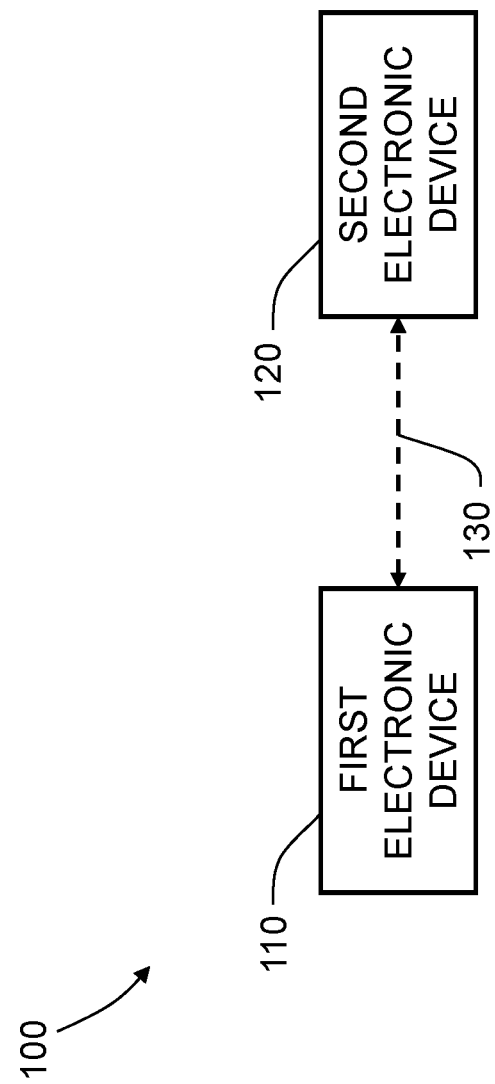
FIG. 1 is a block diagram of a system in accordance with embodiments of the invention.

FIG. 1 is a block diagram of a system 100 in accordance with an embodiment of the invention. As illustrated, system 100 includes a first electronic device 110 and a second electronic device 120. First electronic device 110 and second electronic device 120 are configured to communicate with each other over one or more communications networks 130. Communications network 130 may include one or more of a wireless communications network, an Internet, a personal area network, a local area network, a metropolitan area network, a wide area network, and so forth. Communications network 130 may include local radio frequencies, wireless technologies (BLUETOOTH), cellular (GPRS, CDMA, GSM, CDPD, 2.5G, 3G, 4G LTE, etc.), Ultra-WideBand ("UWB"), wireless broadband network technologies (WIMAX), wireless personal area network technologies (ZIGBEE), and/or other ad-hoc/mesh wireless network technologies.

First electronic device 110 and second electronic device 120 may be any electronic device, such as a desktop computer, laptop computer, electronic workbook, electronic handheld device (such as a mobile phone, smartphone, tablet gaming device, personal digital assistant ("PDA"), portable e-mail device, portable Internet access device, calculator, etc.), point-of-sale device, game controller, wearable device (such as a smartwatch, fitness band, etc.) or other electronic device. In an embodiment, each of first electronic device 110 and second electronic device 120 is a mobile device, such as a smartphone or tablet. In an embodiment, one of first electronic device 110 and second electronic device 120 is a mobile device and the other is a wearable device. To the extent that some embodiments of the invention described below refer to first electronic device 110 and second electronic device 120 as both being mobile devices, it should be understood that the embodiments of the invention are not so limited and first electronic device 110 and second electronic device 120 can be many different types of devices, as listed above.

Figure 2:
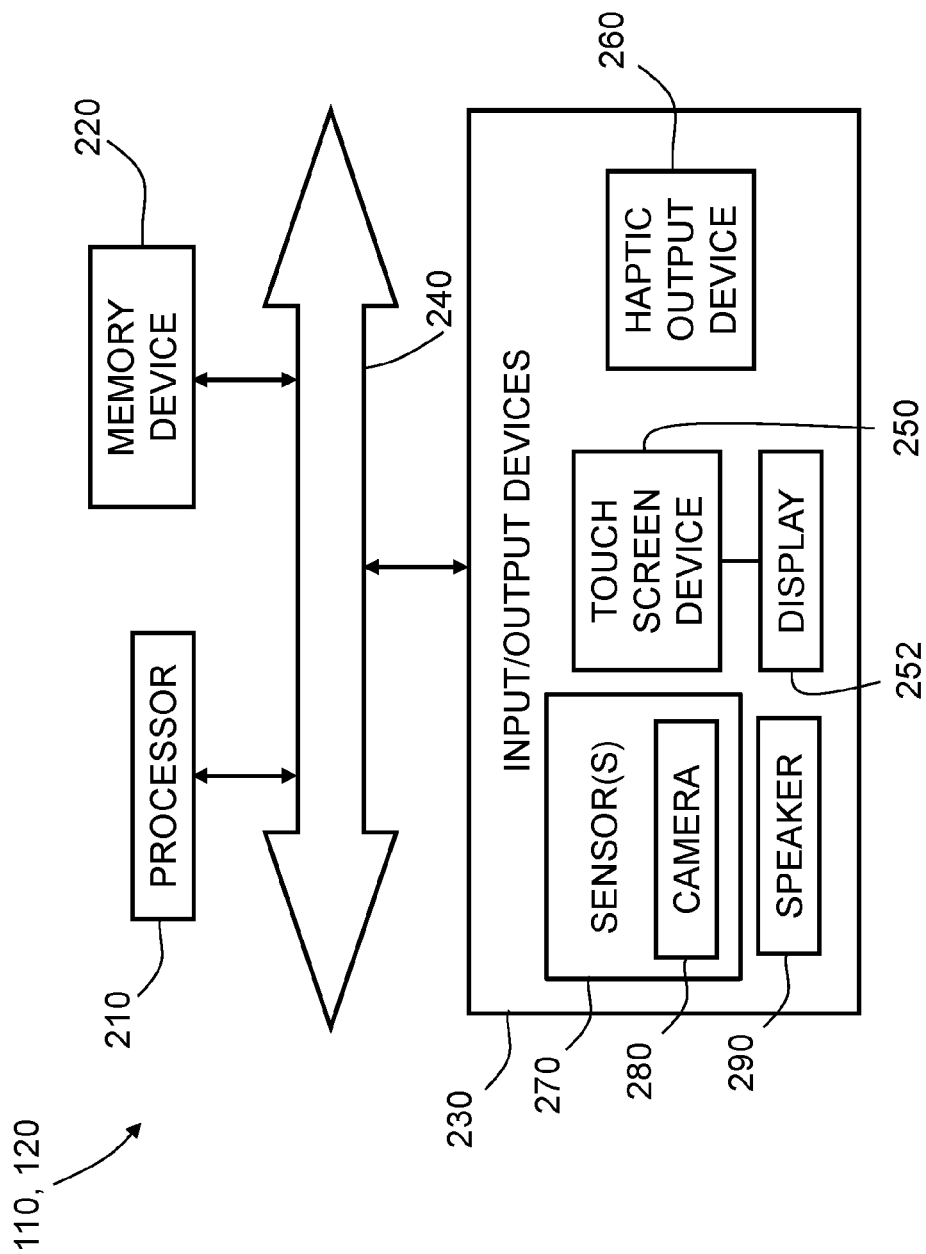
FIG. 2 is a block diagram of a first electronic device and/or a second electronic device in accordance with one embodiment.

FIG. 2 is a block diagram of first electronic device 110 and/or second electronic device 120 in accordance with one embodiment. The description that follows may only refer to the first electronic device 110 with the understanding that the components described herein may also be included in the second electronic device 120. Of course more or less components may be included in the first electronic device 110 and the second electronic device 120. The illustrated embodiment is not intended to be limiting in any way.

As illustrated, first electronic device 110 includes a processor 210, a memory device 220, and input/output devices 230, which are interconnected via a bus 240. In an embodiment, the input/output devices 230 may include a touch screen device 250, a haptic output device 260, one or more sensors 270, which may include a camera 280, and/or other input devices that receive input from a user of first electronic device 110 and output devices that output information to the user of first electronic device 110, such as an audio output device in the form of a speaker 290. The input devices may also include devices such as keyboards, keypads, cursor control devices (e.g., computer mice), styluses, or other data entry devices, or an audio receiver, such as a microphone.

Touch screen device 250 may be configured as any suitable user interface or touch/contact surface assembly. Touch screen device 250 may be any touch screen, touch pad, touch sensitive structure, computer monitor, laptop display device, workbook display device, portable electronic device screen, or other suitable touch sensitive device. Touch screen device 250 may be configured for physical interaction with a user-controlled device, such as a stylus, a finger, etc. In some embodiments, touch screen device 250 may include at least one output device and at least one input device. For example, touch screen device 250 may include a visual display 252 configured to display images and a touch sensitive screen that includes at least one sensor superimposed thereon to receive inputs from a user's finger or a stylus controlled by the user. Visual display 252 may include a high definition display screen. In an embodiment, visual display 252 may be separate from touch screen device 250.

In various embodiments, haptic output device 260 is configured to provide haptic feedback to the user of the first electronic device 110 while the user is in contact with at least a portion of first electronic device 110. For example, haptic output device 260 may provide haptic feedback to touch screen device 250 itself to impose a haptic effect when the user is in contact with touch screen device 250 and/or to another part of first electronic device 110, such as a housing containing at least input/output devices 230.

The haptic feedback provided by haptic output device 260 may be created with any of the methods of creating haptic effects, such as vibration, deformation, kinesthetic sensations, electrostatic or ultrasonic friction, etc. In an embodiment, haptic output device 260 may include an actuator, for example, an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric materials, electro-active polymers or shape memory alloys, a macro-composite fiber actuator, an electrostatic actuator, an electro-tactile actuator, and/or another type of actuator that provides a physical feedback such as vibrotactile feedback. Haptic output device 260 may include non-mechanical or non-vibratory devices such as those that use electrostatic friction ("ESF"), ultrasonic friction ("USF"), or those that induce acoustic radiation pressure with an ultrasonic haptic transducer, or those that use a haptic substrate and a flexible or deformable surface, or those that provide thermal effects, or those that provide projected haptic output such as a puff of air using an air jet, and so on.

Sensor(s) 270 may include a single sensing device or multiple sensing devices that is/are configured to sense and collect mood information relating to the user of first electronic device 110. For example, sensor(s) 270 may be configured to detect and/or collect mood information via various modalities or user's mood states, including but not limited to the user's physical attributes, such as facial expressions, voice pitches, and/or biometrics. In an embodiment, camera 280 may be used to capture images of the user's face and the images may be processed by processor 210 to determine the user's mood, as described in further detail below. A biometric sensor may be used to sense a biomarker, such as body temperature, body humidity or perspiration, heart pulse or rate, breathing rhythms, brain waves, body posture, hand gestures or movements, etc. In an embodiment, the biometric sensor may be provided in a wearable device, such as a wrist band or necklace, and may be configured to sense the user's pulse, as well as predict the user's mood over time.

Sensor(s) 270 may also include pressure sensing mechanisms that can be used to determine a user's mood. For example, how tightly a smartphone is gripped during a telephone call may be sensed and analyzed to determine that a user is in an angry mood. Further, for a keyboard, how hard a user is hitting the keys may be sensed and also analyzed to determine the user's mood. Embodiments can detect the pressure of a user input, and compare the user's pressure to an input profile, to determine a deviation from a "normal" pressure amount. Based on the difference, the user's mood can be determined, and the determined mood can be used to generate an action, such as modifying an haptic effect to be output based on the determined mood.

In an embodiment, the sensing techniques used by sensor(s) 270 may also employ various sound or audio sensors to record and/or facilitate voice analysis. For example, voice frequency and voice intensity while the user is speaking, such as while talking on the phone, may be used to infer the user's mood. Further, the fact that a user may be laughing, angrily making a "grring" sound, cat calling, snoring, etc., may be determined and used to determine a mood of the user.

Sensor(s) 270 may also include a sensor configured to detect ambient conditions. For example, one or more of sensor(s) 270 may collect ambient information relating to surroundings such as temperature, humidity, lighting, atmosphere pressure, etc. Data output by an ambient sensor may be used to help assess the user's mood. In an embodiment, one or more sensor(s) 270 may be used to sense the user's location and movement, so it can be determined whether the user is in a hostile or friendly environment, or whether the user is stuck in traffic, etc. Surroundings may also be detected to suggest automatically generated location-based emoticons. For example, a sensor/camera detecting birthday cakes and balloons may suggest generating/selecting birthday party based emoticons.

Processor 210 may be a general-purpose or specific-purpose processor or microcontroller for managing or controlling the operations and functions of first electronic device 110. For example, processor 210 may be specifically designed as an application-specific integrated circuit ("ASIC") to control output signals to haptic output device 260 to provide haptic effects. Processor 210 may be configured to decide, based on predefined factors, what haptic effects are to be generated based on a haptic signal received or determined by processor 210, the order in which the haptic effects are generated, and the magnitude, frequency, duration, and/or other parameters of the haptic effects. Processor 210 may also be configured to provide streaming commands that can be used to drive haptic output device 260 for providing a particular haptic effect. Processor 210 may also be configured to provide streaming commands to other output devices to initiate other actions, as described below. In some embodiments, the processor 210 may actually be a plurality of processors, each configured to perform certain functions within first electronic device 110. Processor 210 is described in further detail below.

Memory device 220 may include one or more internally fixed storage units, removable storage units, and/or remotely accessible storage units. The various storage units may include any combination of volatile memory and non-volatile memory. The storage units may be configured to store any combination of information, data, instructions, software code, etc. More particularly, the storage units may include haptic effect profiles, instructions for how haptic output device 260 is to be driven, or other information for generating haptic effects. Other profiles, such as physical attribute and mood profiles, may also be stored in memory device 220.

Each of haptic electronic devices 110, 120 can include any number of haptic output devices 260 and sensors 270. Further, each of haptic electronic devices 110, 120 may include different types of haptic output devices 260 and sensors 270, and haptic electronic device 110 may include a different number and different types of combinations of haptic output devices 260 and sensors 270 than haptic electronic device 120.

Figure 3:
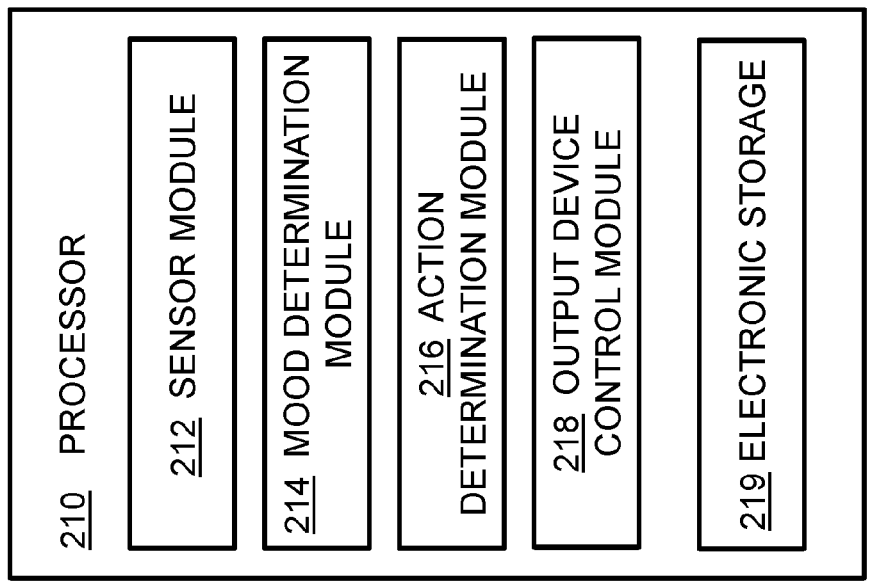
FIG. 3 is a block diagram of the processor of FIG. 2 in accordance with one embodiment.

FIG. 3 is a block diagram of processor 210 of FIG. 2 in accordance with one embodiment. Processor 210 may be configured to execute one or more computer program modules. The one or more computer program modules may include one or more of a sensor module 212, a mood determination module 214, an action determination module 216, an output device control module 218, and/or other modules. Processor 210 may also include electronic storage 219, which may be the same as the memory device 220 or in addition to the memory device 220. Processor 210 may be configured to execute modules 212, 214, 216 and/or 218 by software, hardware, firmware, some combination of software, hardware, and/or firmware, and/or other mechanisms for configuring processing capabilities on processor 210.

It should be appreciated that although modules 212, 214, 216 and 218 are illustrated in FIG. 3 as being co-located within a single processing unit, in embodiments in which there are multiple processing units, one or more of modules 212, 214, 216 and/or 218 may be located remotely from the other modules. The description of the functionality provided by the different modules 212, 214, 216 and/or 218 described below is for illustrative purposes, and is not intended to be limiting, as any of the modules 212, 214, 216 and/or 218 may provide more or less functionality than is described. For example, one or more of the modules 212, 214, 216 and/or 218 may be eliminated, and some or all of its functionality may be provided by other ones of the modules 212, 214, 216 and/or 218. As another example, processor 210 may be configured to execute one or more additional modules that may perform some or all of the functionality attributed below to one of the modules 212, 214, 216 and/or 218.

Sensor module 212 is configured to receive an input signal from sensor(s) 270 that is generated when sensor(s) 270 detects a physical attribute associated with a mood of the user of first electronic device 110, such as the user's facial expression, the user's heartbeat, the user's brain waves, etc. In embodiments in which there are multiple sensors 270, sensor module 212 is configured to receive and process input signals from multiple sensors 270. Sensor module 212 is also configured to send a signal to mood determination module 214 for further processing.

Mood determination module 214 is configured to determine the mood of the user of first electronic device 110 based on the signal received from sensor module 212 and can determine a "mood profile" of the determined mood. For example, if camera 280 is used to capture an image of the user with a smile, mood determination module 214 may analyze the image to determine that the user is in a good mood and is happy. If a biometric sensor is used to sense the user's heartbeat and the sensor senses a rapid heartbeat, mood determination module 214 may be used to determine that the user is anxious and stressed. Mood determination module 214 may be programmed with a library of physical attributes and associated moods so that when senor(s) 270 sense one of the physical attributes, mood determination module 214 may determine the mood of the user of first electronic device 110. Mood determination module 214 may use the user's location, which may be a geo-location sensed by a location sensor, such as GPS, or a situational location, such as attending an important meeting, that may be retrieved from the user's calendar, which may be stored on first electronic device 110 in memory device 220. Mood determination module 214 may also output a signal to action determination module 216 for further processing.

Action determination module 216 is configured to receive the output signal from mood determination module 214 and determine an action to initiate based on the determined mood of the user of first electronic device 110. In an embodiment, the determined action to initiate may include generating a visual, audio and/or haptic effect on second electronic device 120 operated by a second user. The visual effect may be a predetermined text message that reflects the mood of the user of first electronic device 110, which may include an emoticon, and/or a predetermined image, such as an electronic sticker that reflects the mood of the user of first electronic device 110. The audio effect may include a predetermined sound or jingle that reflects the mood of the user of first electronic device 110. The haptic effect may include a predetermined vibration pattern that reflects the mood of the user of first electronic device 110. In an embodiment, action determination module 216 may determine one or more parameters of the haptic effect, such as amplitude, frequency, duration, etc., of the haptic effect.

In an embodiment, action determination module 216 may use an input from one of sensor(s) 270 that is configured to sense a location of the user of first electronic device 110 to modulate the effect that is generated on second electronic device 120 to either accentuate or diminish the effect and thereby provide additional information about the mood of the user of first electronic device 110 to second user of the second electronic device 120.

In an embodiment, action determination module 215 may use an input from one of sensors 270 that is configured to sense a physical attribute associated with the mood of the second user of second electronic device 120, and modulate the action to be initiated based on the sensed physical attribute associated with the mood of the second user so that the effect that is generated on second electronic device 120 is accentuated, diminished, or otherwise altered.

In an embodiment, the mood profile can modulate an accompanying audio or haptic feedback effect. In embodiments where haptic feedback effects are synthesized in real time or near real time, the synthesis parameters can be changed such that they reflect the mood of the sender. For example, in a system where lower pitches are associated with "lower" moods, the frequency of the audio and haptics effects can reflect those moods by becoming lower.

In an embodiment, the action that the action determination module 216 may determine to initiate may include initiating the dialing of a telephone number with first electronic device 110. Such an embodiment may allow the facial cues that are captured by camera 280 to be used in place of a voice command or "speed dial" number or button that correspond to dialing a particular phone number. In an embodiment, the determined action to initiate may include initiating a written communication with the first electronic device 110. Such an embodiment may allow the facial cues that are captured by the camera 280 to be used to dictate a message to be sent as a text message or an e-mail by first electronic device 110. Action determination module 216 may output a signal to output device control module 218 for further processing.

Output device control module 218 is configured to receive the output signal from action determination module 216 and send a control signal to the output device that is to initiate the determined action. For example, if the action to be initiated includes generating a visual, audio and/or haptic effect on second electronic device 210, output device control module 218 may output a signal that can be communicated to second electronic device 210 and sent to the appropriate output device, such as display 252, speaker 290 and/or haptic output device 260. In an embodiment, output device control module 218 may determine one or more parameters of the haptic effect, such as amplitude, frequency, duration, etc., of the haptic effect, instead of the action determination module 216. Similarly, if the action to be initiated includes dialing a telephone number, output device control module 218 may output a signal so that the dialer of the phone of first electronic device 110 opens a telecommunications line and dials the telephone number. If the action to be initiated includes initiating a written communication, output device control module 218 may output a signal that mimics the signal that is output by a keyboard or keypad.

Depending on the application, different modalities may be used to generate targeted mood-based haptic feedback. For example, to share a happy state of mind with a friend while talking over the phone, the communication may be augmented by sending, from one user's phone to another user's phone, haptic cues that signalize the happy mood or pleasant state of mind. To capture a user's emotional state while dialing or talking on a mobile phone, a digital camera or video camera on the mobile phone may be used to capture and then transmit the captured mood information or facial expressions to the user being called.

Figure 4A:
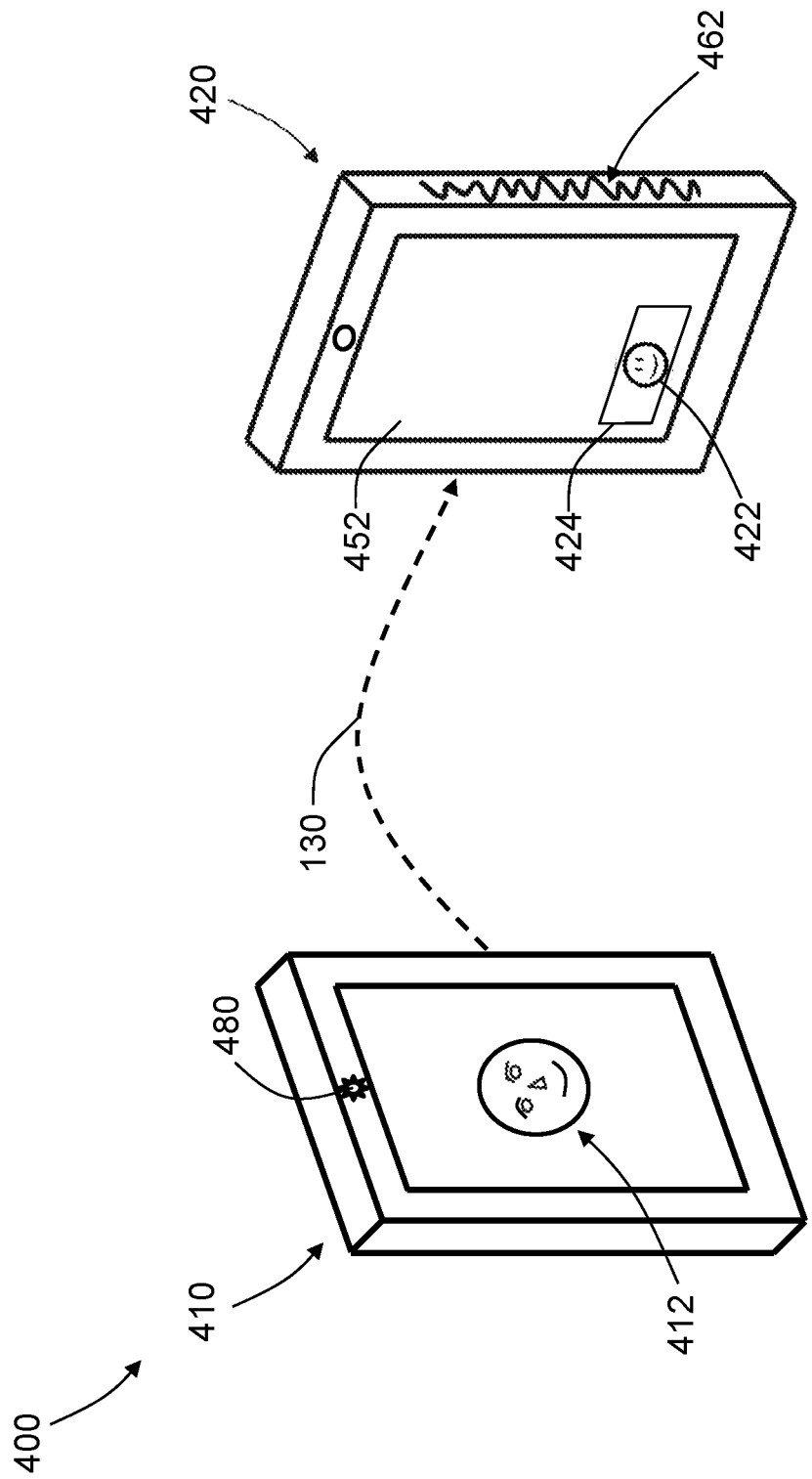
FIGS. 4A and 4B illustrate an implementation of the system in accordance with embodiments of the invention.
Figure 4B:
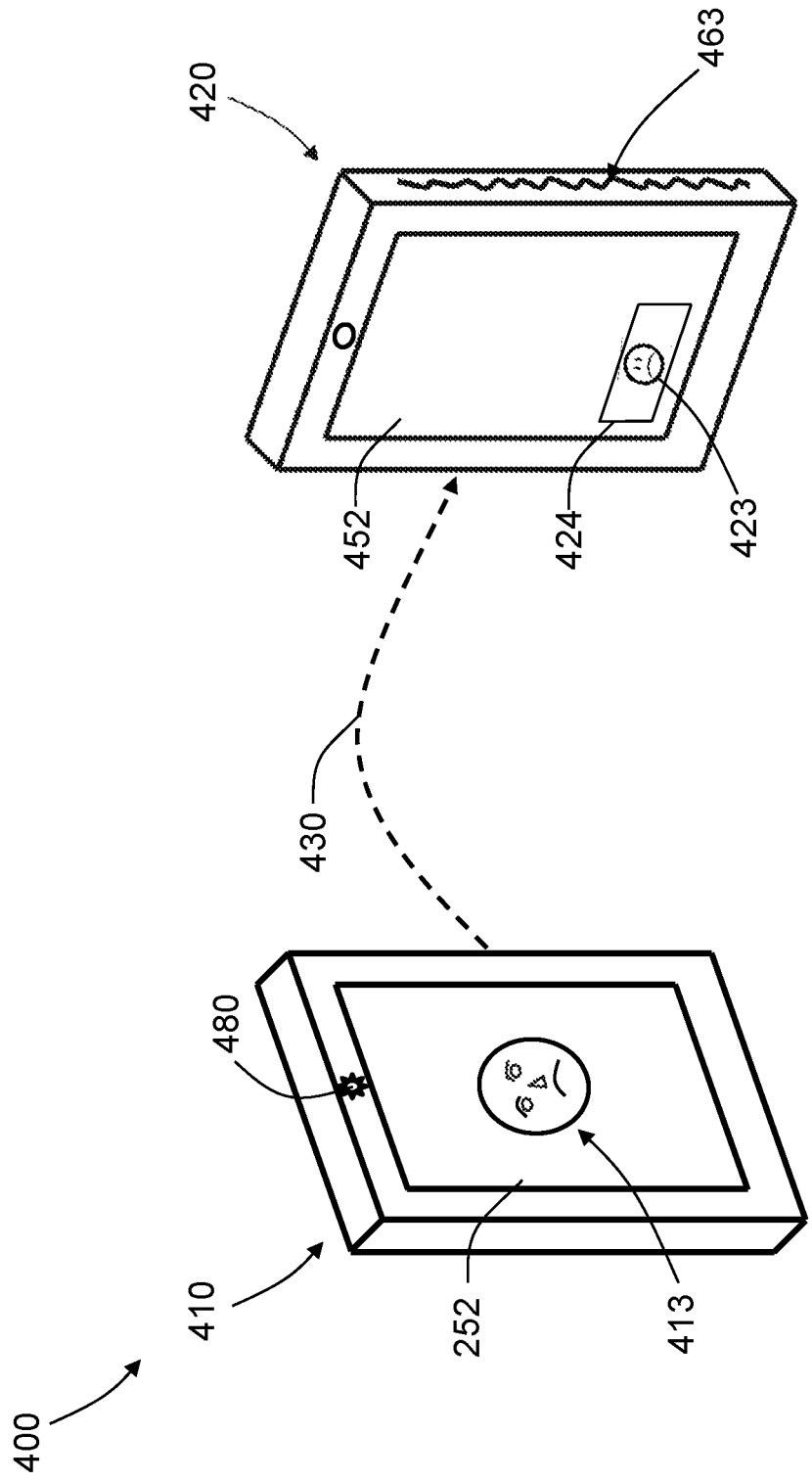

FIGS. 4A and 4B illustrate an implementation system 100 described above in accordance with embodiments of the invention. A system 400 illustrated in FIGS. 4A and 4B includes a first electronic device 410, which may be a mobile phone, such as a smartphone, and a second electronic device 420, which may also be a mobile phone, such as a smartphone. As illustrated in FIG. 4A, a first user of first electronic device 410 may use a front facing camera 480 on first electronic device 410 to capture an image 412 of the first user. A processor, such as processor 210 described above, may receive a signal output by camera 480 and use mood determination module 214 to determine the mood of the first user, which in the embodiment illustrated in FIG. 4A is a happy mood. Processor 210 may then use action determination module 214 to determine an action to initiate based on the happy mood. Output device control module 218 may then output a signal, based on the determined action to be initiated, that may be communicated to second electronic device 420 via communications network 130 described above. In the illustrated embodiment, a happy face electronic sticker 422 is displayed in a text box 424 by a display 452 of the second electronic device 420. At the same time, a haptic effect 462, which may include a relatively strong vibration that may be associated with a happy mood, may be output by a haptic output device, such as haptic output device 260 described above.

As illustrated in FIG. 4B, the first user of first electronic device 410 may use front facing camera 480 on first electronic device 410 to capture another image 413 of the first user. Processor 210 may receive a signal output by camera 480 and use mood determination module 214 to determine the mood of the first user, which in the embodiment illustrated in FIG. 4B is a sad mood. Processor 210 may then use action determination module 214 to determine an action to initiate based on the sad mood. Output device control module 218 may then output a signal, based on the determined action to be initiated, that may be communicated to second electronic device 420 via communications network 130. In the illustrated embodiment, a sad face electronic sticker 423 is displayed in text box 424 by display 452 of second electronic device 420. At the same time, a haptic effect 463, which may include a relatively weak vibration (compared to the haptic effect 462 in FIG. 4A) that may be associated with a sad mood, may be output by haptic output device 260.

In an implementation of embodiments of the invention, a first user of system 100 may open a chat application on his/her electronic device 110 to send a message to a second user of the system 100. As the first user types the message, the camera 280 may be activated. Activation of camera 280 may be automatic or the first user may manually activate camera 280. Camera 280 may capture facial cues that may be used to determine the mood of the first user. Additionally or alternatively, sensors 270 may provide biomarker data or location data to determine the mood of the first user. In an embodiment, calendar data from first electronic device 110 may be used to provide context for the captured facial cues, biomarker data and/or location data to help determine the first user's mood. Processor 210 may determine an appropriate emoticon, electronic sticker, and/or haptic effect to send to a second user of system 100, potentially automatically, so that the second user receives an indication of the first user's mood with the message to help personalize the message and carry meaning in the notification of the message.

Figure 5:
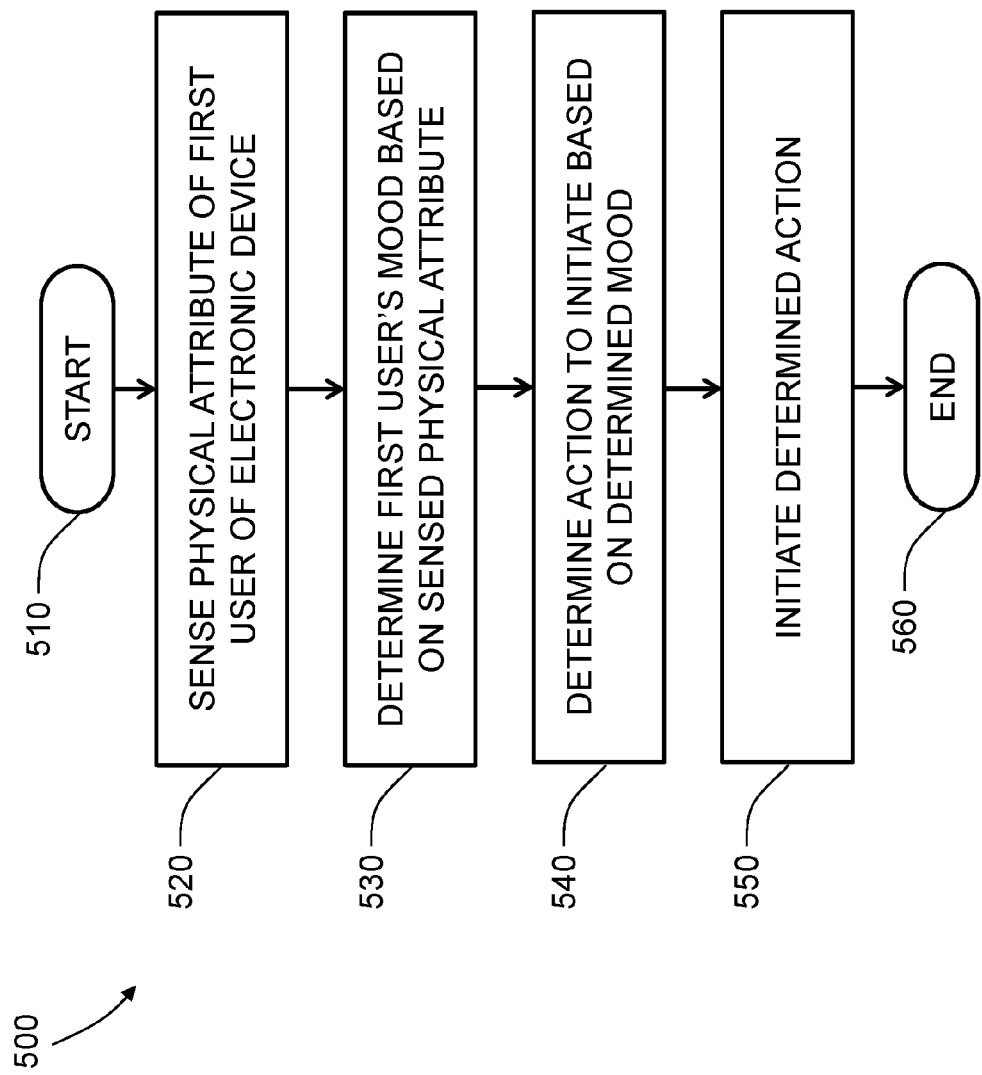
FIG. 5 is a flow diagram of the processor of FIG. 2 when generating actions based on a user's mood in accordance with embodiments of the present invention.

FIG. 5 is a flow diagram of processor 210 of FIG. 2 when generating actions based on a user's mood in accordance with embodiments of the present invention. In one embodiment, the functionality of the flow diagram of FIG. 5 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

As illustrated, flow diagram 500 starts at 510. At 520, a physical attribute of a first user of an electronic device, such as first electronic device 110 described above, is sensed with a sensor, such as one of sensors 170 described above. At 530, the first user's mood is determined based on the sensed physical attribute. The determination may be completed by mood determination module 214 of processor 210 described above when mood determination module 214 is executed by processor 210. At 540, an action to be initiated is automatically determined based on the determined mood. The determination of the action to be initiated may be completed by action determination module 216 of processor 210 described above when action determination module 216 is executed by processor 210. At 550, the determined action is initiated. The action may be initiated by output device control module 218 of processor 210 when output device control module 218 is executed by the processor 210. Flow diagram 500 ends at 560.

The determined action at 550 can include automatically transmitting the mood to another device by transmitting an object that is representative of the mood. The object may be an emoticon or any predetermined image such as an electronic sticker or animated Graphics Interchange Format ("GIF") and may include any type of audio and/or a haptic effect. Further, the object may include only audio, only a haptic effect, or any combination. The object may be transmitted in conjunction with the transmission of a textual message, email, or other entity, or it may be transmitted independently.

In an implementation of embodiments of the invention, a first user of system 100 and a second user of system 100 may communicate by using a chat application ("chat app") on their respective electronic devices 110, 120, which may be in the form of mobile devices, such as smartphones. The first user may type the following message to the second user: "I have big news! I got a promotion today!" The second user may react by making an exaggerated "wow!" face. The front-facing camera on the second user's device may capture the emotion of the second user by capturing an image of his/her face while making the exaggerated "wow!" face. The second user's device may determine that his/her emotion is "surprise" and identify an electronic sticker in an electronic sticker pack or library that matches the "surprise" emotion. For example, the electronic sticker may be an animation of a gorilla looking so surprised that his jaw drops to the floor with a big *THUD!*, which may be felt as a haptic effect integrated with the electronic sticker when the electronic sticker is delivered to the first user.

In one embodiment, the mood profile is used to choose a set of animation parameters that are applied to a visual asset, such as a sticker or avatar. For example, one person might send their friend an animated character. When and/or after the character is sent, the virtual behaviors it exhibits can be modified by the mood profile. If the sender is sad, the character may take on actions and behaviors associated with sadness, such as looking down, shuffling feet, etc. The haptic feedback could match the shuffling of the feet, drawing the recipient's attention to the mood and creating an emotional experience. If the sender's mood changes to become excited, the character can begin jumping up and down, and the recipient can feel an "excited" vibration pattern that matches the jumping with a vibration pulse each time the character lands.

In another implementation of embodiments of the invention, a first user and a second user may be communicating with each other by using a communication platform such as GOOGLE HANGOUTS. The second user may be waiting for the first user to arrive to an event with friends while communicating through the second user's laptop. The second user may be wearing a wearable electronic device that senses signs of stress being felt by the second user caused by the first user being late, which may be confirmed by the first user's GPS location. An emoticon may be sent to the first user's mobile device that suggests the second user's stress level. The first user may receive the message on his/her mobile device while on a bus, for example, on the way to the event. The first user may see that the second user is stressed. As the bus escapes traffic and rapidly approaches the location of the event, the first user's device may capture his/her smile and send a positive emoticon to inform the second user that he/she will be on time. The second user may receive the notification across numerous devices connected to his/her GOOGLE account, including but not limited to the second user's wearable electronic device, mobile phone, a mouse, and a haptically-enabled laptop touchpad, etc.

In another implementation of embodiments of the invention, when a first user of the system begins to type a message to a second user of the system, the second user's device may provide an indication of the second user's mood to the first user so that the first user may take the second user's mood into consideration. For example, the first user may want to send a message that includes a mean joke to the second user. As the first user starts to type the message, the first user may be notified on his/her electronic device 110 that the second user is not in a good mood so that the first user may reconsider whether he/she should alter the wording or timing of the message.

In an implementation of embodiments of the invention, the mood of the first user of the system may be used to determine an action, as described above, and the determined action may be further modulated by the sensed mood of the second user of the system. For example, if the first user's mood is excited, but the second user's mood is morose, the original action determined to be taken based on the first user's mood may be modulated based on the second user's mood so that the effect output to the second user is altered.

Embodiments of the invention may be implemented in a gaming environment. For example, in an implementation of embodiments of the invention, the mood of the first user of the system may be used to influence the first user's avatar in a game and/or may be used to influence other players in a game. In an implementation in which the avatar of the first user of the system severely wounds or eliminates the avatar of the second user of the system, embodiments of the invention may be used to detect whether the second user is upset or angry as a result of the action and communicate the second user's mood to the first user. Such communication of the second user's mood may be helpful if the first user intends to taunt the second user after such an action and would like to be better informed as to whether taunting is a good idea or not, i.e. whether the second user could handle such taunting.

As disclosed, embodiments sense a mood of a user of an electronic device and automatically perform an action based on the mood. Example of an action can be the generation and sending of an electronic message to a second user that includes a visual and/or haptic component reflective of the mood of the first user. The visual and/or haptic component, such as an emoticon sticker, can be automatically chosen based on the mood, thus alleviating the need for the user to make a manual selection.

The embodiments described herein represent a number of possible implementations and examples and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claims.

What is claimed is:

1. A method of operating an electronic device, the method comprising:
   determining a mood of a first user associated with a first electronic device based on a physical attribute of the first user, wherein the physical attribute comprises an input pressure applied by the first user to the first electronic device, and wherein said determining a mood of the first user includes determining a deviation of the input pressure from a normal input in an input profile;

determining an action to be performed by the first electronic device based on the determined mood;

initiating the determined action, wherein the initiating of the determined action comprises transmitting an object that corresponds to the determined mood to a second electronic device, and wherein the object includes a haptic effect that reflects the determined mood; and modulating the determined action to be generated for a second user associated with the second electronic device based on mood information of the second user detected prior to the transmitting of the object to the second electronic device, wherein the modulating of the determined action is performed by a processor of the first electronic device.

2. The method of claim 1, wherein the physical attribute further comprises facial cues of the first user that is determined based on a camera on the first electronic device.

3. The method of claim 1, wherein the physical attribute further comprises at least one of a sensed biomarker of the first user, or a voice of the first user.

4. The method of claim 1, wherein the initiating of the determined action comprises automatically selecting and attaching the object comprising an emoticon or an electronic sticker to a message prepared by the first user.

5. The method of claim 4, wherein the determining of the action further comprises modifying the emoticon or electronic sticker based on the determined mood.

6. The method of claim 1, wherein the initiating of the determined action further comprises automatically transmitting to the second electronic device at least one of a visual effect that reflects the determined mood, or an audio effect that reflects the determined mood.

7. The method of claim 1, wherein the determining of the action is further based on a location of the first user.

8. The method of claim 1, wherein the modulating of the determined action includes accentuating, diminishing or altering a parameter of the determined action.

9. A non-transitory computer readable medium having instructions stored thereon that, when executed by a processor, cause the processor to operate an electronic device, the operating comprising:

determining a mood of a first user associated with a first electronic device based on a physical attribute of the first user, wherein the physical attribute comprises an input pressure applied by the first user to the first electronic device, and wherein said determining a mood of the first user includes determining a deviation of the input pressure from a normal input pressure in an input profile;

determining an action to be performed by the first electronic device based on the determined mood;

initiating the determined action, wherein the initiating of the determined action comprises transmitting an object that corresponds to the determined mood to a second electronic device, and wherein the object includes a haptic effect that reflects the determined mood; and modulating the determined action to be generated for a second user associated with the second electronic device based on mood information of the second user detected prior to the transmitting of the object to the second electronic device.

10. The computer readable medium of claim 9, wherein the physical attribute further comprises facial cues of the first user that is determined based on a camera on the first electronic device.

11. The computer readable medium of claim 9, wherein the physical attribute further comprises at least one of a sensed biomarker of the first user, or a voice of the first user.

12. The computer readable medium of claim 9, wherein the initiating of the determined action comprises automatically selecting and attaching the object comprising an emoticon or an electronic sticker to a message prepared by the first user.

13. The computer readable medium of claim 12, wherein the determining of the action further comprises modifying the emoticon or electronic sticker based on the determined mood.

14. The computer readable medium of claim 9, wherein the initiating of the determined action further comprises automatically transmitting to the second electronic device at least one of a visual effect that reflects the determined mood, or an audio effect that reflects the determined mood.

15. The computer readable medium of claim 9, wherein the determining of the action is further based on a location of the first user.

16. An apparatus, comprising:

a sensor for collecting first mood information for a first user associated with the apparatus;

a processor generating (i) a determined mood based on the first mood information based on a physical attribute of the first user, wherein the physical attribute comprises an input pressure applied by the first user to the apparatus, and wherein said processor generates the determined mood by determining a deviation of the input pressure from a normal input in an input profile, (ii) a determined action to initiate based on the determined mood, and (iii) a modulated action by modulating the determined action to be generated for a second user associated with a second apparatus based on second mood information of the second user detected prior to transmitting an object that corresponds to the determined mood to the second apparatus, wherein the processor transmits the object that corresponds to the determined mood to the second apparatus, and wherein the object includes a haptic effect that reflects the determined mood.

17. The apparatus of claim 16, further comprising:

a camera, wherein the physical attribute further comprises facial cues of the first user that is determined using the camera.

18. The apparatus of claim 16, wherein the physical attribute further comprises at least one of a sensed biomarker of the first user, or a voice of the first user.

19. The apparatus of claim 16, wherein the processor modulates the determined action by accentuating, diminishing or altering a parameter of the determined action.

* * * * *